United States Patent
Bolinger Jr. et al.

[19]

[11] Patent Number: 5,875,237
[45] Date of Patent: *Feb. 23, 1999

[54] TELECOMMUNICATIONS NETWORK ROUTING

[75] Inventors: William Harrison Bolinger Jr., Overland Park, Kans.; Belinda Sue Carpenter; Danny Ray Letterman, both of Liberty, Mo.; Ginny Sue Krystel, Leawood, Kans.; William Roger Blessing, Oakton, Va.; Tommie Liggett Holmes, Lee's Summit, Mo.

[73] Assignee: Sprint Communications Co. L.P., Kansas City, Mo.

[*] Notice: The term of this patent shall not extend beyond the expiration date of Pat. No. 5,617,748.

[21] Appl. No.: 813,623

[22] Filed: Mar. 7, 1997

Related U.S. Application Data

[63] Continuation of Ser. No. 132,398, Oct. 6, 1993, Pat. No. 5,617,448.

[51] Int. Cl.⁶ ................................................ H04M 15/00
[52] U.S. Cl. ......................... 379/114; 379/116; 379/117; 379/119; 379/121
[58] Field of Search ........................... 379/111–115, 121, 379/120, 127, 116, 201, 221; 435/406, 407, 408, 445

[56] References Cited

U.S. PATENT DOCUMENTS 5,216,703   6/1993   Roy ......................................... 455/445

*Primary Examiner*—Paul Loomis
*Attorney, Agent, or Firm*—Harley R. Ball; Jeo W. Caven

[57] ABSTRACT

A telecommunications system handles 800 calls between first and second networks in different countries. In the preferred embodiment, call handling equipment of the second network receives a call from a call origin in the first network, wherein the call was placed using an 800 number corresponding to a destination in the second network and wherein the second network includes interexchange carriers and local exchange carriers. Preferably, the call is received in call handling equipment of one of the interexchange carriers and carried to the destination by the interexchange carrier to which the 800 number is assigned. In one embodiment, the call is reoriginated after receipt by the call handling equipment of a local exchange carrier which routes the call to the assigned interexchange carrier. Billing charges are assessed to the origin for international toll charges and to the destination for 800 toll charges in the second network.

15 Claims, 2 Drawing Sheets

TELECOMMUNICATIONS NETWORK ROUTING

This application is a continuation of application Ser. No. 08/132,398, filed Oct. 6, 1993, and now U.S. Pat. No. 5,617,448.

BACKGROUND OF THE INVENTION

1. Field of the Invention

The present invention relates to the field of telecommunications. More particularly, the invention concerns a system for handling 800 calls between first and second networks in different countries in which toll charges from the origin to the destination country, including international toll charges, are assessed to the origin and destination network toll charges are assessed to the destination.

2. Description of the Prior Art

Special handling numbers such as so-called 700, 800 and 900 numbers have greatly facilitated the growth in telecommunications traffic and improvement in business communications. For example, 800 numbers are special because the destination subscriber is billed for toll charges associated with the call instead of the call originator.

When a caller dials an 800 number, the local exchange carrier (LEC) in which the call originates accesses a remote database to determine which interexchange carrier (IXC). has been assigned by the 800 number subscriber to carry the call. When this is determined, the call is transferred to the assigned IXC at its point-of-presence (POP). The IXC then accesses its own database to translate the 800 number into a destination number. In response, the IXC switch routes the call over the IXC network to the destination, which is usually by way of the LEC in which the destination is located. With an 800 call, the IXC recognizes the special nature and bills the destination for the toll charges instead of the origin.

With the efficiencies and low cost of modern telecommunications, many businesses have found it cost effective to absorb the toll charges associated with 800 calls as a technique for improving service and developing new customers. In general, however, 800 number subscribers have not been willing to absorb the cost of international toll charges, which are substantially higher, for calls originating in other countries. As a result, 800 calls are blocked when originating in other countries. Typically the local telephone company in the foreign country blocks further transmission of a call placed to an 800 number having a destination in another country. In other circumstances, the interexchange carrier of the destination country blocks the call when received at its international gateway switch.

The blocking of 800 calls in foreign locations has created inconvenience and hardship in some circumstances. Often the caller only knows the 800 number of a destination but cannot complete the call even if the caller is willing to pay the international toll charges. For example, if a tourist loses his or her travelers checks, only the 800 number of the issuer may be known, but yet the tourist is prevented from contacting the issuer because the 800 number is blocked. As another example, individuals often see 800 numbers advertised in printed materials such as newspapers and magazines or on internationally transmitted broadcasts of television programming from another country. A potential customer may wish to call the 800 number to order a product or service, but is unable to do so because of the blocking of direct-dialed 800 numbers.

The use of a so-called international toll-free numbers has not solved the prior art problems. With this type of number, the destination business is billed for all of the toll charges, both international and domestic. This is expensive for the subscriber, however, and it is only cost effective in limited circumstances, usually with adjacent countries from which the international toll charges are comparatively low.

The prior art also includes the 800 number operator redial system in which a caller in another country first dials a conventional direct-dial number that terminates with an operator in the destination country. The caller is billed for the international toll charges and may also be billed a premium for operator assistance. The caller then tells the operator the desired 800 number, who then manually redials this 800 number for the caller. As those skilled in the art appreciate, this system only saves the domestic toll charges in the destination country, which are typically low in comparison to the international charges. Because of the additional time for the operator assistance and associated premium, this redial system often results in higher charges to the caller than if the caller had dialed the destination directly.

SUMMARY OF THE INVENTION

The present invention solves the prior art problems discussed above and provides a distinct advance in the state of the art. More particularly, the call handling system hereof allows a caller in a one country to dial an 800 number associated with a destination in another country with the international toll charges assessed to the call origin and with the destination network charges assessed to the destination.

The preferred method includes the step of receiving the call from a call origin in a first network into call handling equipment in a second network, wherein the call was placed using a called number corresponding to a destination in the second network. The call handling equipment responds to receipt of the call by using the called number for determining the routing of the call over the second network whereupon the call is carried over the second network to the destination. A portion of the toll charges are assessed to the call origin and a portion assessed to the destination. In preferred forms, the networks are in different countries and the toll charges include international charges assessed to the origin and domestic network charges assessed to the destination.

The second network preferably includes interexchange and local exchange carriers, and the called number includes an 800 number assigned to one of the interexchange carriers. The call is received into the call handling equipment of an IXC and then carried to the destination using the IXC to which the 800 number is assigned. In one embodiment, the receiving IXC transfers the call to a LEC which reoriginates the call using the 800 number. In so doing, the LEC determines the assigned IXC and transfers the call to that IXC for transport to the destination. In other forms, the receiving IXC transfers the call directly to the assigned IXC which, in some cases, may be the same IXC that received the call at the international gateway.

DETAILED DESCRIPTION OF THE PREFERRED EMBODIMENT

Figure 1:
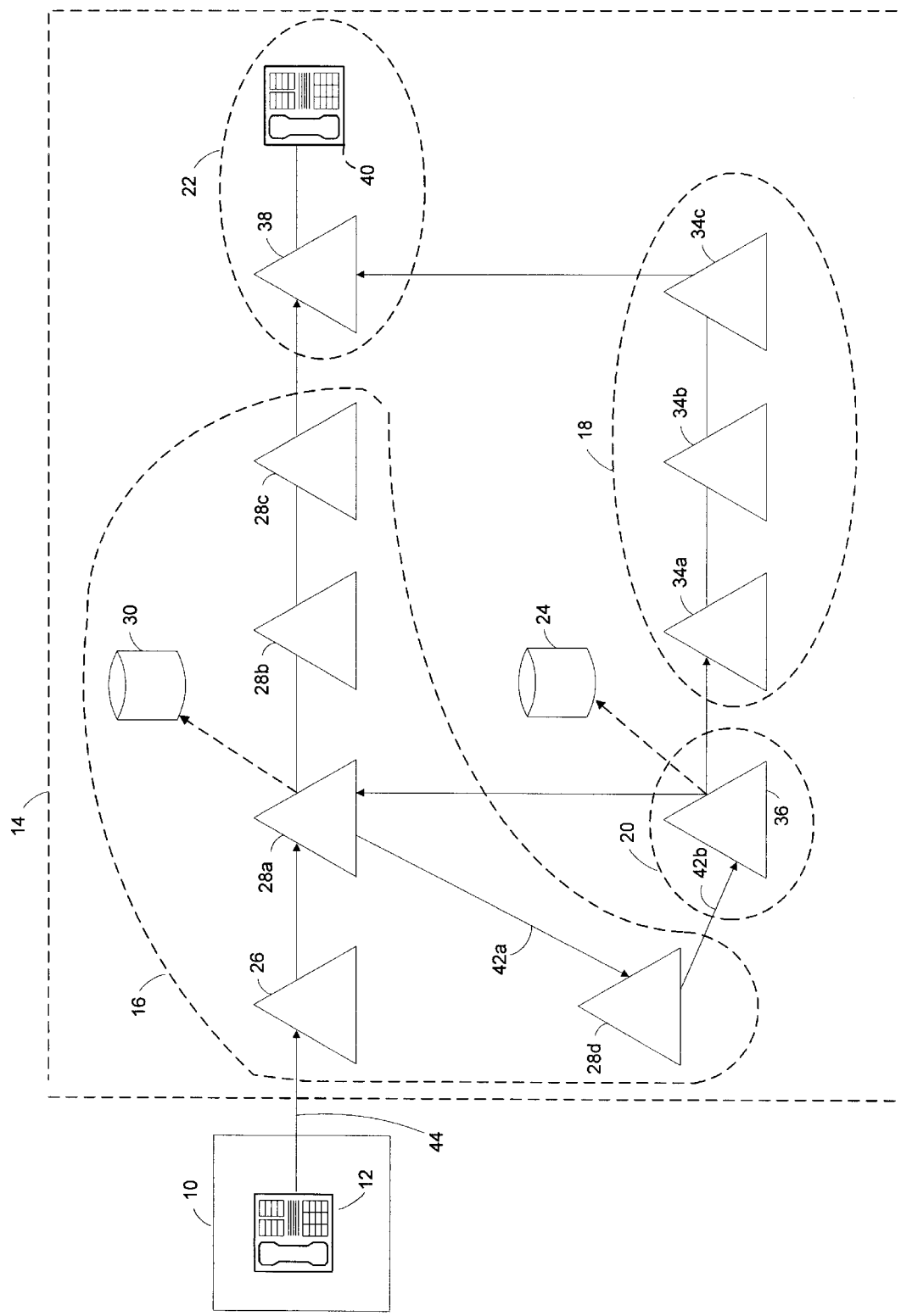
FIG. 1 is a schematic representation of two telecommunications networks including the apparatus of the present invention.

FIG. 1 illustrates first telecommunications network 10 including calling station 12 and second telecommunications network 14, which includes a plurality of interexchange carriers (IXC) represented by IXCs 16 and 18, a plurality of local exchange carriers (LEC) represented by LECs 20 and 22, and IXC identifier database 24. In the preferred embodiment, first network 10 represents a plurality of telecommunications networks located in a respective plurality of different countries from which calls can be placed from various call origins represented by calling station 12 to second network 14, which represents a telecommunications network of the destination country.

IXC 16 includes international gateway switch 26 (DMS 300), a plurality of network switches (DMS 250) illustrated by switches 28a, 28b, 28c and 28d, and translation database 30. The various switches and other equipment are conventionally interconnected for billing and carrying telecommunications traffic as is well understood by those skilled in the art. Additionally, intermachine dedicated line 32 connects gateway switch 26 with network switch 28a.

IXC 18 also includes a plurality of network switches represented by switches 34a, 34b and 34c. LEC 20 includes a plurality of switches (DMS 100) represented by switch 36 and LEC 22 includes a plurality of switches represented by switch 38. Call destination 40 is located in LEC 22 and is representative of a plurality of possible destinations in second network 14 for calls placed from origin 12.

Intermachine trunk line 42a provides service between network switch 28a and switch 28d which is the point-of-presence of network 16 with LEC 20. Additionally, intermachine trunk line 42b provides service between switch 28d and LEC switch 36. Lines 42a and 42b provides Feature Group D capability and supply answer supervision for calls routed thereover.

In operation, a caller places a call from calling station 12 using a called number corresponding to destination 40. The called number is preferably a special handling number (also called an N00 number) such as a 700, 800 or 900 type number with an 800 number being particularly preferred as the called number.

Figure 2:
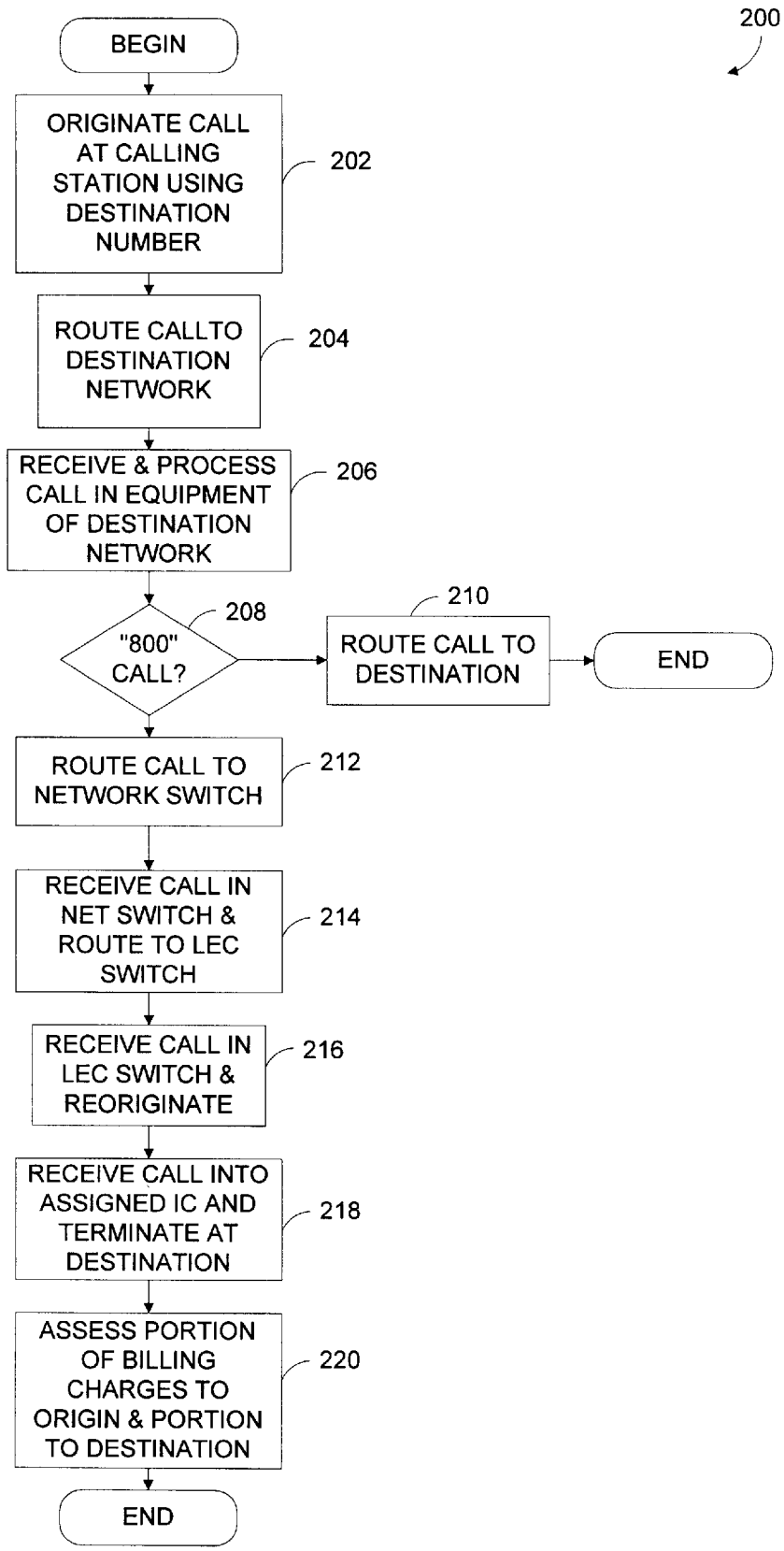
FIG. 2 is a flow chart illustrating the operation of the present invention.

FIG. 2 illustrates the preferred operation of the present invention. In typical operation, the caller places the call from station 12 by dialing an international access prefix (e.g., 011), a country code (e.g., 01) and then the destination number such as 800 NXX XXXX (step 202). In step 204, first network 10 responds by routing the call over international line 44 to second network 14. Within network 14, the call is received (step 206) into call handling equipment, initially into international gateway switch 26 in the preferred embodiment. Switch 26 is configured to analyze the NPA portion (800 portion) of the called number and within switch 26, step 208 asks whether the called number is an 800 number. If no, step 210 conventionally routes the call to its destination.

If the answer in step 208 is yes, indicating that the call has been placed to an 800 number, the call is routed over inter-machine line 32 to IXC switch 28 in step 212. Because only 800 type calls are received over line 32, switch 28 responds in step 214 by routing the call over the network as represented by line 42a, switch 28d and line 42b to LEC switch 36. In this way, switches 26 and 28a provide the means i.e., the call handling equipment, for receiving a call from station 12 into network 14.

LEC switch 36 is configured to respond to calls received over line 42 by reoriginating those calls in step 216. In the process of reoriginating the call, LEC switch 36 queries database 24 with the 800 number. Database 24 answers with the identity of the interexchange carrier that has been assigned by the subscriber to carry its 800 calls. LEC switch 36 then hands off the call to the assigned IXC. LEC switch 36 and the IXC switch to which the call is transferred provide the means for responding to receipt of the call and for determining the routing over network 14 to destination 40.

In the preferred embodiment, LEC switch 36 also attaches a so-called pseudo-ANI (automatic number identification) to the 800 number as it is transferred to the IXC. The pseudo-ANI substitutes for the telephone number of calling station 12 and can be used to identify the nature of the call as one originating in another country. As those skilled in the art will appreciate, the pseudo-ANI could also be attached to the digit string at gateway switch 26 or network switch 32.

As illustrated in FIG. 1, the IXC assigned by the subscriber to carry the 800 call such as IXC 18 could be different from IXC 16 that receives the call at its international gateway switch. If such is the case, when IXC 18 receives the call in step 218 at its point-of-presence switch 34a, IXC 18 accesses its own database to translate the 800 number into the destination telephone number corresponding to destination 40. With this information, IXC 18 then routes the call to destination 40 by way of LEC 22. If IXC 16 is the assigned carrier for the 800 call, LEC 20 transfers the call to IXC 16 (for example, to point-of-presence 28d) which routes the call to destination 40 in the same manner as IXC 18.

Finally in step 220, billing charges are assessed. In the preferred embodiment, gateway switch 26 tracks the call minutes from network 10. The toll charges associated with the call from calling station 12 to switch 26 include the international toll charges from network 10 to network 14 are assessed for billing by network 10 to station 12, the call origin. The charges assessed to station 12 may also include network charges within network 10.

Periodically, the telephone company of network 14 and the respective carriers in network 10 settle any charges based on the differences in call minutes received and sent between these networks as tracked by the respective international gateway switches. In this way, an increase in traffic from network 10 to network 14 results in a reduction in charges paid or an increase in revenue by the IXCs of network 14.

The toll charges associated with the call within network 14 are assessed for billing to destination 40. In particular, the charges billed to destination 40 are the 800 type charges associated with an 800 call originating at LEC switch 36 and terminating at destination 40 by the IXC that carried the call. These charges are typically the charges assessed by the IXC that carried the call. The result is that a caller in one country can place a call to an 800 number associated with a destination in another country with the call origin (station 12) assessed a portion of the toll charges and with the destination (destination 40) assessed another portion of the toll charges. The equipment of network 10 and the IXC that carried the call within network 14 provide the means for assessing the billing charges to the origin and to the destination.

As will be appreciated by those skilled in the art, one of the purposes of reoriginating the call at LEC 20 is to ensure that the call is carried over the assigned IXC and so that the billing charges for the call within network 14 are properly assessed to destination 40. If the receiving IXC and the assigned IXC are the same, e.g., IXC 16, it may be desirable to route the call directly over this IXC to the destination and bypass call reorigination at a LEC. It may also be desirable to bypass LEC reorigination even when the IXC assigned by the subscriber is different from the receiving IXC. In such circumstances, gateway switch 26 may query database 24 directly for the identity of the assigned IXC, IXC 18 for example, and route the call to the assigned IXC for termination at destination 40.

In some situations, customers dialing an 800 number from foreign network 10 for a destination in network 14 may be confused thinking that the entire call is tollfree to the customer as it would be if dialed within network 14. To alleviate this, the N00 prefix could be a different set of numbers such as "300." For example, instead of dialing 800-NXX-XXXX, customers would be instructed to dial 300-NXX-XXXX. In the preferred embodiment, network 10 would recognize the substitute prefix 300 and replace it with 800, or even some other specified prefix. With this arrangement, 800 number subscribers in network 14 might advertise in network 10 using the 300 prefix. This would alert potential callers that they would be billed for the international portion of the call.

In the alternative, the replacement could occur within network 14. As those skilled in the art will appreciate, other variations are possible to alleviate any potential confusion concerning special handling numbers. As an example, the digits 500 might be used in lieu of the digits 900 for this type of special handling call.

Other billing variations are also encompassed by the present invention. For example, the destination subscriber may be willing to absorb a larger portion of the total toll charges in order to encourage calls from other countries. In such cases, the origin and destination could be assessed billing charges representing predetermined percentages of the total toll charges with a limit placed on the total assessed to the destination, for example.

It is to be understood that the above-described embodiment is simply illustrative of the application of the principles in accordance with the present invention. Other embodiments may be readily devised by those skilled in the art which may embody the principles in spirit, in scope. For example, it will also be appreciated that the present invention encompasses utility with so-called regional 800 numbers. Some regional Bell operating companies (RBOCs) provide subscribers with 800 numbers operable only within that RBOC's region and which are blocked when originating elsewhere. With the present invention, the toll charges for a regional 800 call originating from outside the subscriber's RBOC region could be assessed in part to the origin and in part to the destination. Specifically, the toll charges between the two regions could be assessed to the call origin and the toll charges from within the subscriber's RBOC region could be assessed to the destination as if the call originated within that RBOC region. Thus, it is to be further understood that the methodology described herein is not limited to the specific forms shown by way of illustration but may assume other embodiments limited only by the scope of the appended claims.

Having thus described the preferred embodiments of the present invention, the following is claimed as new and desired to be secured by Letters Patent:

1. A method of routing toll-free calls between a calling station serviced by a first telecommunications network and a destination serviced by a second telecommunications network, comprising the steps of:

receiving, in a gateway associated with the second telecommunications network, a toll-free call originating from the first telecommunications network;

routing the toll-free call to a switch having call origination capabilities and configured to query a database to determine the IXC selected by the toll-free subscriber to carry the toll-free call to the destination;

reoriginating the call at the switch; and transferring the call to the selected IXC to carry the toll-free call to the destination, whereby the network can generate a separate billing record for the toll charges for the portion of the call from the re-originating switch to the destination.

2. The method of claim 1, wherein the step of receiving the toll-free call in the gateway switch includes the step of:

analyzing call signaling information associated with the toll-free call to verify that the call was placed to a toll-free number.

3. The method of claim 1, wherein the step of reoriginating the call includes the steps of:

attaching to the toll-free number a pseudo-ANI that identifies the call as one that originated in a foreign country.

4. The method of claim 1, wherein the step of reoriginating the call includes the steps of:

attaching to the toll-free number a pseudo-ANI that identifies the call as one that originated outside the geographic region served by an RBOC.

5. The method of claim 1, wherein the step of routing the toll-free call to a switch having call origination capabilities includes the step of:

routing the call over a transmission line dedicated to toll-free calls.

6. The method of claim 1, wherein the step of reoriginating the call includes the steps of:

querying a database associated with the switch to determine the identity of the IXC assigned to carry toll-free calls to the destination.

7. The method of claim 1, wherein the step of reoriginating the call includes the steps of:

generating a second billing record to record the toll charges from the switch to the destination.

8. The method of claim 1, wherein the step of reoriginating the call includes the steps of:

attaching to the toll-free number a pseudo-ANI that identifies the call as one that originated in a foreign country.

9. The method of claim 1, wherein the step of reoriginating the call includes the steps of:

attaching to the toll-free number a pseudo-ANI that identifies the call as one that originated outside the geographic region served by an RBOC.

10. The method of claim 1, further comprising the step of:

routing the toll-free call to the destination.

11. The method of claim 10, further comprising the step of:

querying a database to translate the toll-free number into a telephone number corresponding to the destination number.

12. The method of claim 1, further comprising step of:

assessing toll charges for the portion of the call originating at the switch and terminating at the destination to the subscriber of the toll-free number.

13. The method of claim 1, further comprising step of:

assessing toll charges for the portion of the call originating at the switch and terminating at the destination to the subscriber of the toll-free number.

14. A method of routing international calls within a telecommunications network to enable an IXC to assess toll charges for transport provided by the IXC's network to the subscriber of the IXC's toll-free service, comprising the steps of:

receiving an international call in a international gateway switch associated with the telecommunications network;

analyzing call signaling information associated with the international call to determine whether the call was placed to a toll-free number;

routing toll-free calls to a LEC switch having call origination capabilities and configured to query a database to determine the IXC selected by the toll-free subscriber to carry the toll-free call to the destination;

reoriginating the toll-free call at the LEC switch, whereby a separate call record is generated for the toll-free call; and transferring the toll-free call to the selected IXC to carry the toll-free call to the destination, whereby the network can assess toll charges for the portion of the call from the re-originating switch to the destination to the subscriber of the IXC's toll-free service.

15. A telecommunications network adapted to receive international toll-free calls and to enable an IXC to assess toll charges for transport provided by the IXC's network to the subscriber of the IXC's toll-free service, the network comprising:

an international gateway switch for receiving international calls and adapted to identify toll-free calls and to route toll-free calls to a LEC switch;

a LEC switch adapted to receive international toll free calls over a predetermined connection and configured to reoriginate international toll-free calls, whereby a separate call record is generated and to transfer the call and associated call record to the IXC designated to transport calls to the toll-free number; and an IXC network adapted to route the international toll-free call to the destination number and to assess toll charges for the transport services from the LEC switch to the destination to the subscriber of the toll-free service.

* * * * *